Aug. 23, 1966 J. R. SHEA 3,268,741

DIVIDER CIRCUIT USING J-K MICROELECTRONIC CIRCUIT FLIP FLOPS

Filed June 8, 1964

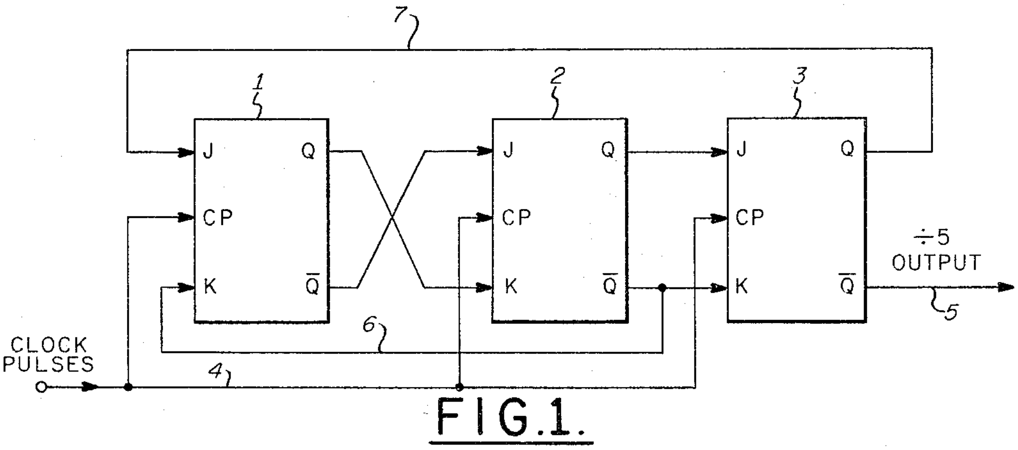

FIG.1.

| | ELEMENT 1 | ELEMENT 2 | ELEMENT 3 |
|---|---|---|---|
| 1 | 0 | 0 | 0 |
| 2 | $J_0=0$<br>$K_0=1$ | $J_0=1$<br>$K_0=0$ | $J_0=0$<br>$K_0=1$ |
| 3 | 0 | 1 | 0 |
| 4 | $J_1=0$<br>$K_1=0$ | $J_1=1$<br>$K_1=0$ | $J_1=1$<br>$K_1=0$ |
| 5 | 0 | 1 | 1 |
| 6 | $J_2=1$<br>$K_2=0$ | $J_2=1$<br>$K_2=0$ | $J_2=1$<br>$K_2=0$ |
| 7 | 1 | 1 | 1 |
| 8 | $J_3=1$<br>$K_3=0$ | $J_3=0$<br>$K_3=1$ | $J_3=1$<br>$K_3=0$ |
| 9 | 1 | 0 | 1 |
| 10 | $J_4=1$<br>$K_4=1$ | $J_4=0$<br>$K_4=1$ | $J_4=0$<br>$K_4=1$ |
| 11 | 0 | 0 | 0 |

FIG.3.

| $J^n$ | $K^n$ | $Q^{n+1}$ |
|---|---|---|
| 0 | 0 | $Q^n$ |
| 0 | 1 | 0 |
| 1 | 0 | 1 |
| 1 | 1 | $\bar{Q}_n$ |

FIG.2.

INVENTOR.
JOHN R. SHEA
BY
Robert J. Haase
ATTORNEY

United States Patent Office 3,268,741 Patented August 23, 1966

3,268,741

DIVIDER CIRCUIT USING J-K MICROELECTRONIC CIRCUIT FLIP FLOPS

John R. Shea, Huntington Station, N.Y., assignor to Sperry Rand Corporation, a corporation of Delaware Filed June 8, 1964, Ser. No. 373,267
4 Claims. (Cl. 307—88.5)

The present invention generally relates to circuits for dividing the repetition rate of input pulses, and more particularly, to a pulse repetition rate divider circuit consisting of a plurality of interconnected J–K microelectronic flip flops and requiring no circuit elements external to the flip flops other than conductive interconnections.

With the advent of microelectronic circuit fabrication techniques, attention has been given to the design of standardized logical circuit components produced on a single monolithic block of semiconductor material. Many of the standardized components are designed with a view toward use as basic building blocks from which digital computers may be constructed. One of the basic building blocks of interest is the bistable memory element. Ordinarily, the memory element comprises an Eccles-Jordan flip flop together with auxiliary circuit elements for the routing or steering of input pulses to the flip flop terminals, depending upon the desired manner in which the flip flop is to respond to the input pulses. One of the desired logical conditions to be met by a memory element is that each of the possible combinations of input pulses that might be applied thereto results in a predictable output from the flip flop. In particular, it is desirable that a predictable output be produced when both inputs simultaneously are "one" and when both inputs simultaneously are "zero."

A memory elment which yields a predictable output for every possible combination of pulse inputs is the "J–K flip flop" which is described, for example, beginning on page 128 of Logical Design of Digital Computers by Montgomery Phister, Jr., John Wiley and Sons, Inc., 1958. Briefly, the J–K memory element exhibits the properties reflected in the following truth table wherein $J^n$ represents the value of the $n$th input pulse applied to the J terminal, $K^n$ represents the value of the $n$th input pulse applied to the K terminal, and $Q^{n+1}$ represents the state in which the memory element is placed as a result of the application of the $J^n$ and $K^n$ input pulses

| $J^n$ | $K^n$ | $Q^{n+1}$ |
|---|---|---|
| 0 | 0 | $Q\not{c}$ |
| 0 | 1 | 0 |
| 1 | 0 | 1 |
| 1 | 1 | $\overline{Q^n}$ |

J–K flip flops recently have become available commercially in the form of minute monolithic blocks of semiconductor material upon which all of the circuit elements are formed. It is desirable, of course, that the very significant reduction in size and weight permitted by the use of microelectronic circuit components such as the monolithic J–K flip flop be not comprised by circuit designs which introduce unnecessary components external to the microelectronic circuit components. For example, in the design of a pulse repetition rate dividing circuit, it is preferable that a design be sought in which the required function can be achieved simply by the direct interconnection of available standardized microelectronic circuit components without the use of any devices external to the microelectronic circuit components other than the direct electrical interconnections per se. Such a design ensures that the resulting pulse repetition rate dividing circuit fully exploits all of the desirable features inherent in the microelectronic circuit.

It is the principal object of the present invention to provide a pulse repetition rate dividing circuit using solely interconnected J–K flip flop microelectronic circuit components.

Another object is to provide a circuit for dividing the repetition rate of input pulses by a factor of five through the use of interconnected J–K flip flop microelectronic circuit components.

A further object is to provide a pulse repetition rate dividing circuit utilizing J–K flip flop microelectronic circuit components and having an unloaded output at which a divided repetition rate signal is produced.

These and other objects of the present invention as will appear more fully from a reading of the following specification are accomplished in a preferred divide by five embodiment by the provision of three J–K flip flop microelectronic circuit components. Each of the microelectronic circuit components is adapted to receive three input signals and provides one of two possible output signals representing the binary state of the component resulting from the application of the input pulses. A source of input pulses whose repetition rate is to be divided is applied to one of the three inputs. The other two inputs are "steering" terminals designated J and K, respectively. With the exception of one of the output terminals of one of the elements, the output terminals of each element is connected to the respective steering terminals of a succeeding element so as to form a "ring" configuration. A divided repetition rate signal is available at the unconnected output terminal. The steering terminal associated in the same microelectronic circuit component with the unconnected output terminal is connected to the steering terminal of the element next following said component in the "ring" configuration. The final necessary structural feature of the present invention is that the connections between two successive microelectronic circuit components are reversed relative to all of the other connections.

For a more complete understanding of the present invention, reference should be had to the following specification and to the appended figures of which:

FIG. 1 is a simplified block diagram of a divide by 5 embodiment of the present invention;

FIG. 2 is a truth table representing the response characteristics of the microelectronic circuit components utilized in the embodiment of FIG. 1; and FIG. 3 is a tabulation of the successive binary states resulting in each of the microelectronic circuit components during one complete cycle of operation of the embodiment of FIG. 1, i.e., during one repetition interval of the output signal.

Referring to FIG. 1, the reference numerals 1, 2 and 3 generally represent respective J–K flip flop microelectronic circuit components each of which is characterized in operation by the truth table of FIG. 2. For the sake of exposition, the convention will be adopted that the presence of a pulse represents the binary value unity and the absence of a pulse represents the binary value zero. Accordingly, and with reference to FIG. 2, the component remains in its pre-existing state if no pulses are applied to the J and K input terminals. If no pulse is applied to the J terminal but a pulse is applied to the K terminal, the component is placed in state "zero." The component is placed in state "one" if a pulse is applied to the J terminal but no pulse is applied to the K terminal. Finally, if pulses are applied simultaneously to both the J and K terminals, the state of the component reverses from the state that pre-existed the application of the pulses. All of the transitions represented in the truth table of FIG. 2 require the application of a clock pulse in addition to the J and K pulses, if any.

The clock pulses (pulses whose repetition rate is to be divided) are applied by line 4 jointly to the inputs designated "CP" of the respective components. The output terminal designated "Q" in each component produces a "one" (pulse) output if the steering terminal associated with it receives a "one" (pulse) and the other steering terminal receives a "zero" (no pulse). Thus, a pulse is produced at output "Q" if a pulse is applied to J and no pulse is applied to K of the same microelectronic circuit component. Conversely, a pulse is produced at $\overline{Q}$ if a pulse is applied to K and no pulse is applied to J.

Generally, the output terminal of a given component is connected to the corresponding steering terminal of a succeeding component to form a ring configuration of components. For example, the output Q of component 2 is applied to the steering input J of component 3 and the output $\overline{Q}$ of component 2 is applied to the steering terminal K of component 3. One of the output terminals, namely, the $\overline{Q}$ output terminal 5 of component 3 is not connected to or loaded by any other component. It is advantageous to derive the output signal from unloaded terminal 5 so that a maximum number of subsequent circuits may be driven without further amplification by the signal produced at terminal 5. As will be seen, the output signal on terminal 5 is an asymmetrical square wave whose repetition interval is five times as long as the repetition interval of the input pulses.

The output terminal Q is connected to the steering terminal J of component 1. It should be noted at this point that component 1 next follows component 3 from the point of view of the ring configuration. The steering terminal K of element 3 associated with the unloaded output 5 is connected by lead 6 to the steering terminal K of component 1 whereby said terminal K is driven by the output $\overline{Q}$ of component 2. Lastly, one of the interconnections between two successive components are reversed relative to all of the remaining interconnections. In the case of the embodiment of FIG. 1, the reversed connections are between components 1 and 2 whereby the output Q of component 1 is connected to the steering terminal K of succeeding component 2 and the output $\overline{Q}$ of component 1 is connected to the steering terminal J of succeeding component 2.

The operation of the embodiment of FIG. 1 will now be described with reference to the table of FIG. 3. The odd-numbered rows of the table represent the successive states assumed by each of the three microelectronic circuit components 1, 2, and 3. The even-numbered rows of the table represent the binary values of the inputs to the steering terminals J and K resulting from the states of components 1, 2, and 3 represented in the immediately preceding odd-numbered row. It is arbitrarily assumed that each of the microelectronic circuit components 1, 2, and 3 initially is in state zero. As will be shown later, it is possible that the respective components may assume any arbitrary states upon initial energization but there will be no lasting effect upon the sequence of the binary values in the tabulation. With each of the components in the assumed initial state zero, signals representing the binary states one and zero are applied to the respective steering terminals J and K of each of the respective components in accordance with line two of the tabulation. For example, the J terminal of component 1 receives a zero signal by virtue of its connection to the Q terminal of component 3 and the fact that component 3 is in state zero (terminal Q produces a one output only if the element is a state one). The K terminal of component 1 receives a one signal by virtue of its connection to terminal $\overline{Q}$ of component 2 and so on. In response to the first clock pulse applied by lead 4, the states shown in line 1 of the table are converted to the states shown in line 3. More particularly, the state of component 2 reverses from zero to one while the states of components 1 and 3 remain zero. The next clock pulse produces the states shown in line 5, and so forth.

As previously stated, the initial states assumed by the components 1, 2, and 3 do not mutate the sequence shown in the table of FIG. 3. Obviously, if components 1, 2, and 3 assumed any of the states represented by the odd-numbered rows in FIG. 3, the ensuing sequence of operation will be identical to that shown. Only the phase of the output asymmetrical square wave on terminal 5 will be affected by the arbitrary states into which the components 1, 2, and 3 are placed upon initial energization. It will be noted that of the 8 possible states into which the three components may be initially placed, three are not shown in the table of FIG. 3. The omitted states are 001, 110, and 100. If elements 1, 2, and 3 initially assume the respective state of 0, 0 and 1, the first clock pulse on lead 4 will change the state to 1, 1 and 0. The next following clock pulse causes the state 1, 1 and 0 to become 1, 0 and 1, respectively, which is one of the allowed states depicted in FIG. 3. In the event that components 1, 2 and 3 respectively assume state 1, 1 and 0 upon initial energization, the first clock pulse on lead 4 will produce state 1, 0 and 1 which was noted as allowed. Lastly, if components 1, 2, and 3 respectively assume state 1, 0 and 0, the assumed state is converted into 000 upon the occurrence of the first clock pulse on lead 4. State 000 is an allowed state in FIG. 3.

Thus, the pulse repetition rate dividing circuit of FIG. 1 is placed immediately into the normal sequence of operation if the individual components thereto initially assume any one of 5 possible states (represented by rows 1, 3, 5, 7 and 9 of FIG. 3). In the event that either state 110 or state 100 arbitrarily is assumed upon initial energization, the counter will be placed into the normal sequence of operation upon the occurrence of the first clock pulse on lead 4. Normal sequence is begun after the first two clock pulses if state 001 is initially assumed. The need for auxiliary starting circuits is eliminated whereby nothing other than the direct electrical interconnections per se are required external to the microelectronic circuit components 1, 2, and 3 to constitute the pulse rate counter. A worthwhile feature is that the waveforms available at the outputs of component 1 are unaffected by the fortuitous event that one of the three states 001, 110, and 100 is assumed upon initial energization. Thus, the pulse divider system designer need make no special provision for the elimination of the spurious states even where a momentary non-normal output could not be tolerated. In the majority of applications where initial start-up transients can be ignored, any of the component outputs including the unloaded terminal 5 may be used for deriving a divided repetition rate waveform.

The divide by five embodiment of the present invention represented in FIG. 1 is of particular interest in that it may be easily converted into a divide by ten configuration simply by the addition of a triggerable flip flop coupled to receive the square wave output signal on lead 5.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus comprising a plurality of J–K flip flop circuit components, each component having first and second input steering terminals and a third input terminal and providing two output signals at two respective output terminals associated with said steering terminals representing the binary state of the component, and a source of input pulses coupled to said third input terminal of each of said components, all output terminals excepting one of the output terminals of one of the components being connected to the steering terminals of succeeding components so as to form a ring configuration, the steering terminal associated in the same component with said one output terminal being connected to a steering terminal of the component next following said same component in said ring configuration, the connections between two successive components being reversed relative to the connections between all other components.

2. A pulse repetition rate dividing circuit comprising a plurality of J–K flip-flop circuit components, each component having first and second input steering terminals and a third input terminal and providing two output signals at two respective output terminals associated with said steering terminals representing the binary state of the component, and a source of input pulses whose repetition rate is to be divided, said source being coupled to said third input terminal of each of said components, all output terminals excepting one of the output terminals of one of the components being connected to the steering terminals of succeeding components so as to form a ring configuration, an output signal having a repetition interval fractionally related to the repetition interval of said input pulses being produced at said one output terminal, the steering terminal associated in the same component with said one output terminal being connected to a steering terminal of the component next following said same component in said ring configuration, the connections between two successive components being reversed relative to the connections between all other components.

3. A pulse repetition rate dividing circuit comprising first, second and third J–K flip flop circuit components, each component having first and second input steering terminals and a third input terminal and providing two output signals at two respective output terminals associated with said steering terminals representing the binary state of the component, and a source of input pulses whose repetition rate is to be divided, said source being coupled to said third input terminal of each of said components, all output terminals excepting one of the output terminals of said third component being connected to the steering terminals of succeeding components so as to form a ring configuration, an output signal having a repetition interval fractionally related to the repetition interval of said input pulses being produced at said one output terminal, the steering terminal associated in said third component with said one output terminal being connected to a steering terminal of said first component, the connections between two successive components being reversed relative to the connections between all other components.

4. A pulse repetition rate dividing circuit comprising first, second and third J–K microelectronic circuit flip flop components, each component having first and second input steering terminals and a third input terminal and providing two output signals at two respective output terminals associated with said steering terminals representing the binary state of the component, and a source of input pulses whose repetition rate is to be divided, said source being coupled to said third input terminal of each of said components, all output terminals excepting one of the output terminals of said third component being connected to the steering terminals of succeeding components so as to form a ring configuration, an output signal having a repetition interval fractionally related to the repetition interval of said input pulses being produced at said one output terminal, the steering terminal associated in said third component with said one output terminal being connected to a steering terminal of said first component, the connections between said first and second components being reversed relative to the connections between all other components.

References Cited by the Examiner

UNITED STATES PATENTS 2,853,238 9/1958 Johnson ------------ 307—88.5

OTHER REFERENCES

Electronic Equipment Engineering, "The Integrated J–K Flip-Flop," by David C. Davies, April 1964, pages 54–56.

ARTHUR GAUSS, *Primary Examiner.*

J. ZAZWORSKY, *Assistant Examiner.*